United States Patent [19]

Young et al.

[11] Patent Number: 5,482,351
[45] Date of Patent: Jan. 9, 1996

[54] AIRCRAFT SEAT WITH CRASH ABSORBSION MECHANISM

[75] Inventors: Ronald L. Young, Menominee, Mich.; Kurt F. Breuer; David E. Brandt, both of Marinette, Wis.

[73] Assignee: ERDA, Inc., Peshtigo, Wis.

[21] Appl. No.: 93,771

[22] Filed: Jul. 19, 1993

[51] Int. Cl.⁶ ........................................... B60N 2/42
[52] U.S. Cl. ..................... 297/216.20; 797/216.1
[58] Field of Search ................. 297/216.1, 216.16, 297/216.19, 216.20

[56] References Cited

U.S. PATENT DOCUMENTS

| | | | |
|---|---|---|---|
| 3,081,059 | 3/1963 | Hastings et al. | 297/216.20 |
| 4,588,226 | 5/1986 | Young et al. | 297/349 |
| 4,671,572 | 6/1987 | Young et al. | 297/349 |
| 4,861,103 | 8/1989 | Vallee | 297/216.20 |
| 4,911,381 | 3/1990 | Cannon et al. | 297/216.20 |
| 5,344,210 | 9/1994 | Marwan et al. | 297/216.20 |

*Primary Examiner*—Richard A. Bertsch
*Assistant Examiner*—William J. Wicker
*Attorney, Agent, or Firm*—Godfrey & Kahn

[57] ABSTRACT

A seat including a first portion; a support member borne by the first portion; and a second portion borne by the support member and disposed in space relation thereto, and wherein the seat is borne by the second portion, and wherein the first portion is positioned in force transmitting relation relative to the support member, and wherein force applied to the seat is transmitted through the first portion to the support member thereby causing the support member to deform and thus dissipate some of the force acting upon the seat.

10 Claims, 5 Drawing Sheets

AIRCRAFT SEAT WITH CRASH ABSORBSION MECHANISM

BACKGROUND OF THE INVENTION

1. Field of the Invention

The present invention relates to a seat and more particularly to an aircraft seat having a force dissipation assembly which is operable to dissipate some of the forces which act upon the aircraft seat during an aircraft mishap such as a crash or the like.

2. Description of the Prior Art

It is well known that airplanes vary considerably in their size, performance and function, from single engine sport planes, to large airliners or supersonic fighter aircraft. Before the 1930's when airplanes had wooden, wire-braced frames covered by fabric, the seating arrangements for occupants of such aircraft included only seatbelts which operated to restrain the occupant in their seat. However, as the performance of aircraft have improved and more specifically, the speed of same have increased, engineers have developed improved seating arrangements which have enhanced the safety of the passengers in the event of an aircraft mishap.

For example, many of the developments and improvements in seating for aircraft have been directed to the use of lightweight structural materials such as aluminum alloys, titanium, and composite materials such as fiber reinforced plastics which, when combined together, provide a seat which is lightweight, crashworthy, and durable.

Notwithstanding the improvements made in aircraft seating, the designers of aircraft have endeavored to make the overall aircraft as well as its individual components thereof increasingly crashworthy.

While the prior-art improvements in aircraft have operated with varying degrees of success, they have had several shortcomings which have detracted from their usefulness. More specifically, safety improvements made in aircraft have been largely directed to instrumentation which provides the aircraft crew with various warnings regarding unsafe operational conditions. Such enhanced instrumentation has included such devices as improved radars, sensors for detecting adverse conditions in engines or other mechanical assemblies and inertial navigational equipment to name but a few.

In aircraft where mishaps and crashes are more likely to occur, such as in military aircraft, increased emphasis has been directed to developing seating arrangements which will eject the passengers from the fuselage in the event that the aircraft is rendered nonairworthy through malfunction, destruction or other mishap. In aircraft such as large airliners, such seating is inappropriate because of the large number of seats, and further in view of the costs of installing such assemblies in the aircraft. In light of this, aircraft seating in large passenger aircraft has remained essentially unchanged over the past twenty years, although the risks of injury attendant to crashing in such aircraft has not diminished significantly.

Therefore, it has long been known that it would be desirable to have a seat and more specifically, an aircraft seat which has a force dissipation assembly which is operable to dissipate some of the force exerted on the aircraft seat during an aircraft mishap such as a crash or the like thereby improving the safety of the passenger.

OBJECTS AND SUMMARY OF INVENTION

Therefore, it is an object of the present invention to provide an improved seat which finds particular usefulness in aircraft applications, and which further has a force dissipation assembly.

Another object of the present invention is to provide a seat which is operable to obtain the individual benefits to be derived from related prior-art apparatuses and practices while avoiding the detriments individually associated therewith.

Another object of the present invention is to provide a seat which includes a portion having a deformable core, and wherein the seat further includes an assembly which engages the deformable core during a mishap, or crash, thereby further dissipating some of the force of the crash.

Another object of the present invention is to provide a seat which may be manufactured as original equipment, or alternatively may be manufactured in the nature of a retrofit.

Another object of the present invention is to provide a seat which is relatively simple in design, which is easy to install, and which further requires no substantial alteration of the cabin of the aircraft to accommodate same.

Another object of the present invention is to provide a seat having a force dissipation assembly which is lightweight, compact, efficient, and further can be purchased at a relatively nominal price.

Another object of the present invention is to provide a seat which is characterized by ease of utilization, simplicity of construction, and which further operates in the absence of external sources of power.

Another object of the present invention is to provide improved elements and arrangements thereof in a seat for the purposes described and which is dependable, economical, durable, and fully effective in accomplishing its intended purposes.

These and other objects and advantages of the present invention are achieved in a seat which includes a first portion, a support member mounted on the first portion, and a second portion borne by the support member and disposed in spaced relation to the first portion, the first portion positioned in force transmitting relation relative to the support member, and wherein force applied to the seat is transmitted through the first portion to the support member thereby causing the support member to deform and thus dissipate some of the force acting upon the aircraft seat.

DETAILED DESCRIPTION OF THE PREFERRED EMBODIMENT

Figure 1:
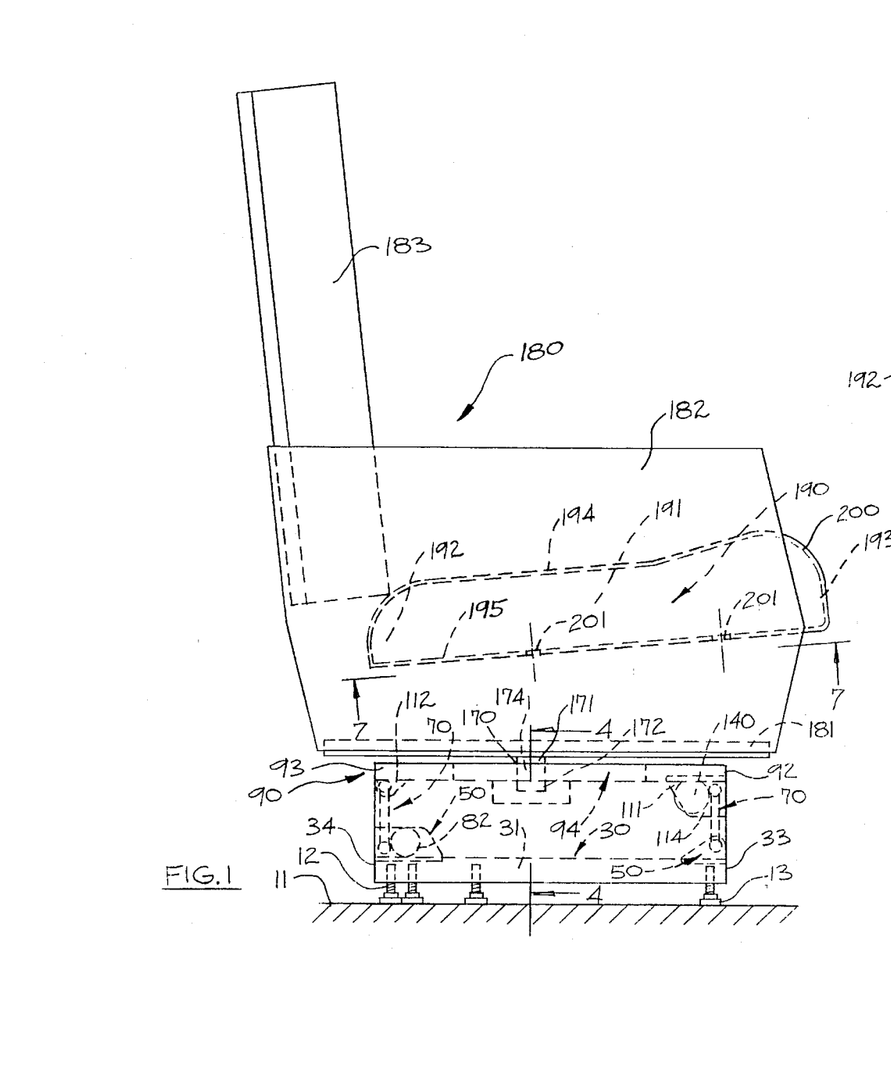
FIG. 1 is a side elevation view of the seat of the subject invention shown in a typical, operative configuration with some underlying structures shown in phantom lines.
Figure 2:
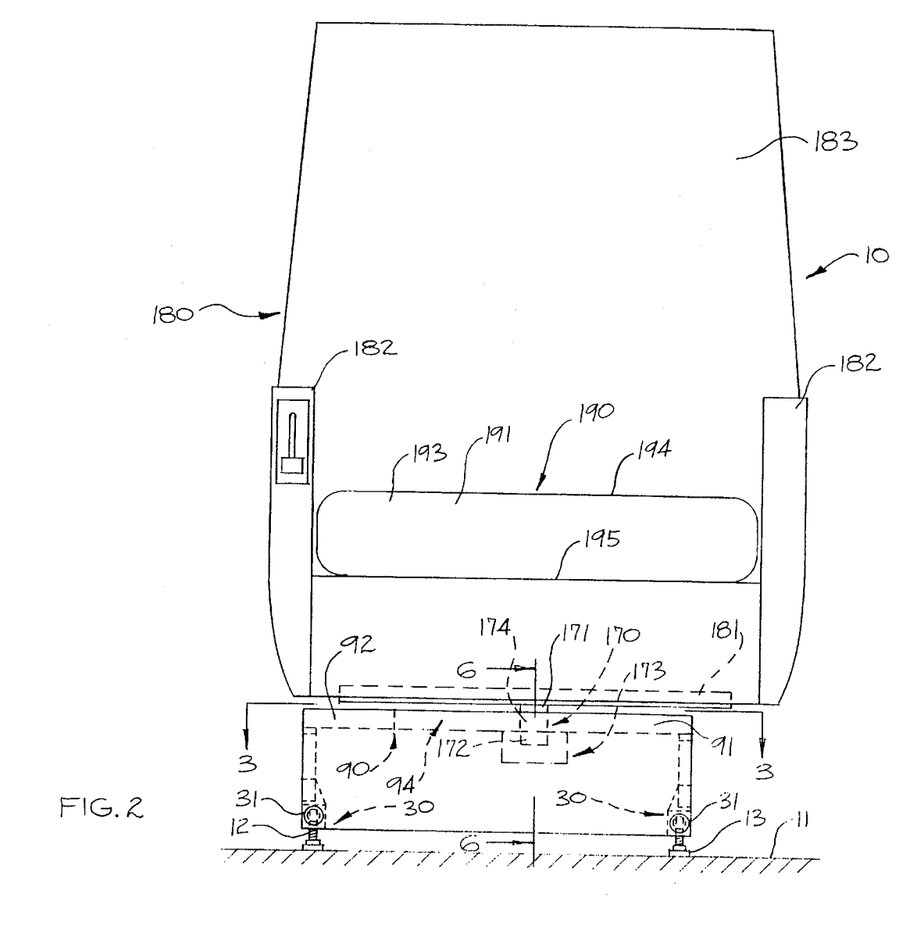
FIG. 2 is a front elevation view of the seat of the subject invention shown in FIG. 1 with some underlying structures shown in phantom lines.

Referring more particularly to the drawings, the seat of the subject invention, which is useful in aircraft applications, is generally indicated by the numeral 10 in FIGS. 1 and 2. As shown therein, the seat is illustrated as it would be configured if it were installed in a conventional aircraft having a cabin floor 11. It should be understood, however, that the present invention while described herein as being mounted in an aircraft, is not limited to such environments, but may further find usefulness in other overland vehicles such as all manner of automobiles, trucks, and watercraft.

Figure 4:
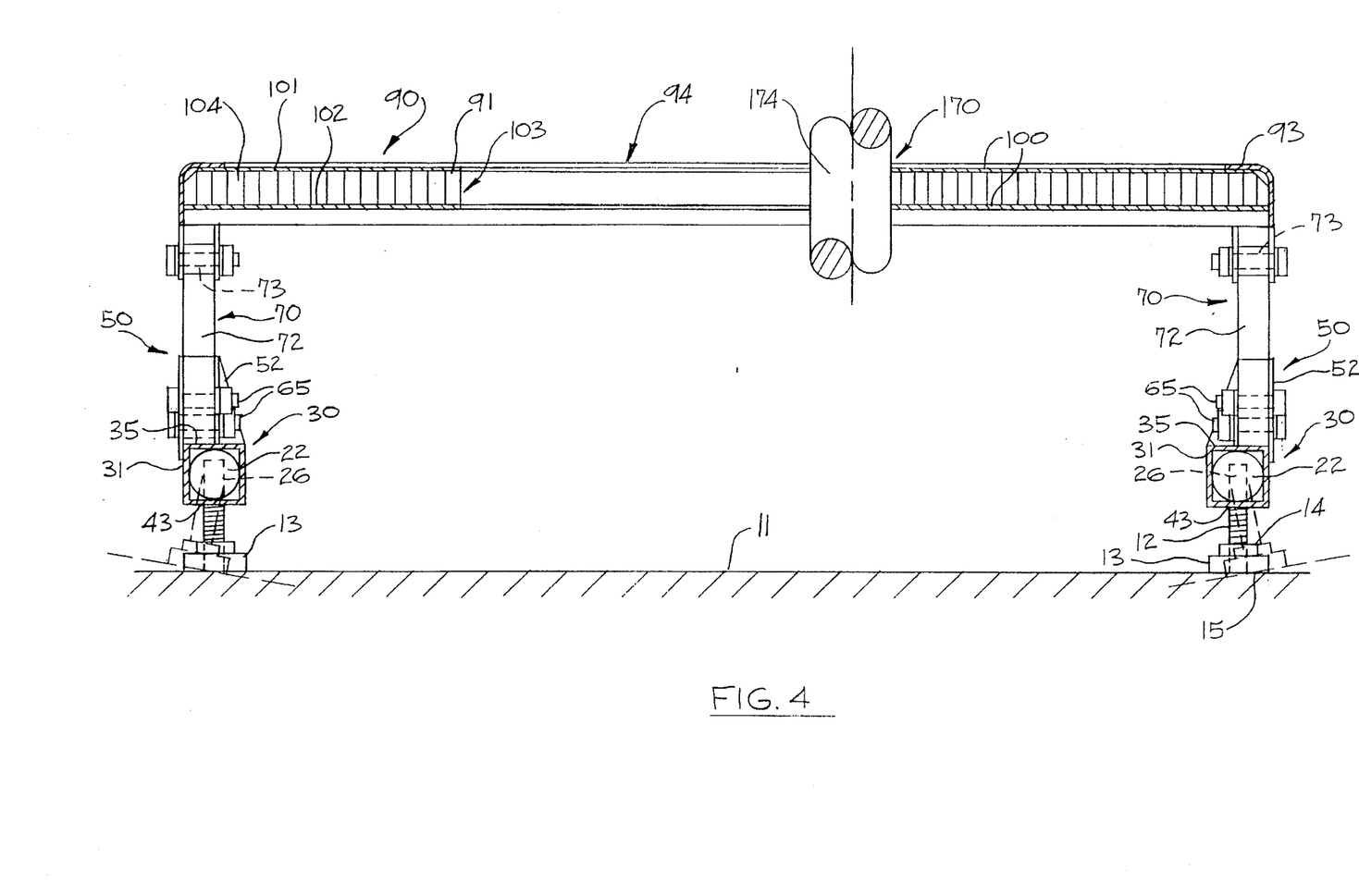
FIG. 4 is a fragmentary, vertical, sectional view of the seat of the subject invention and which is taken from a position along line 4—4 of FIG. 1.
Figure 6:
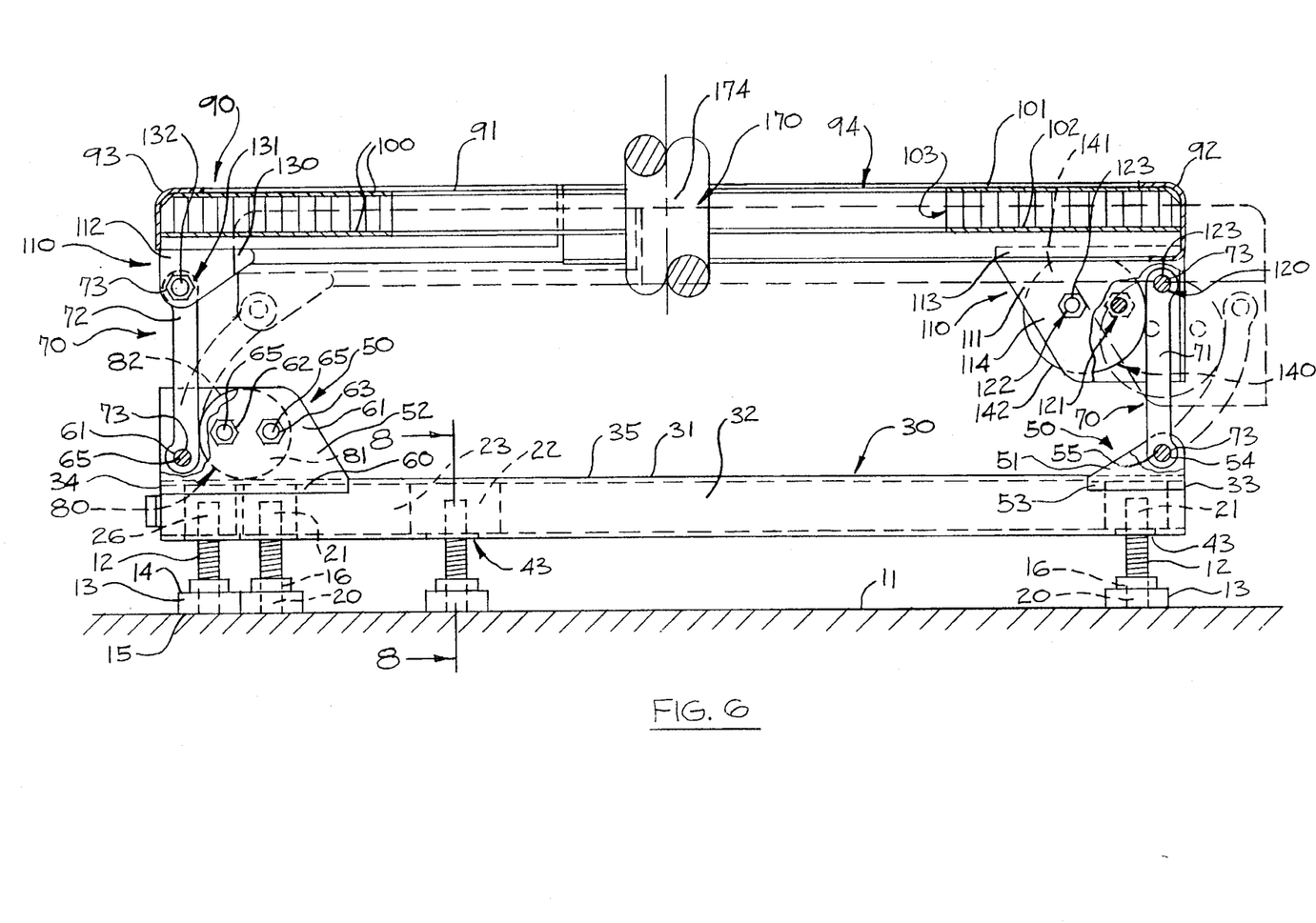
FIG. 6 is a fragmentary, somewhat enlarged, vertical sectional view of the seat of the subject invention, and which is taken from a position along lines 6—6 of FIG. 2.
Figure 8:
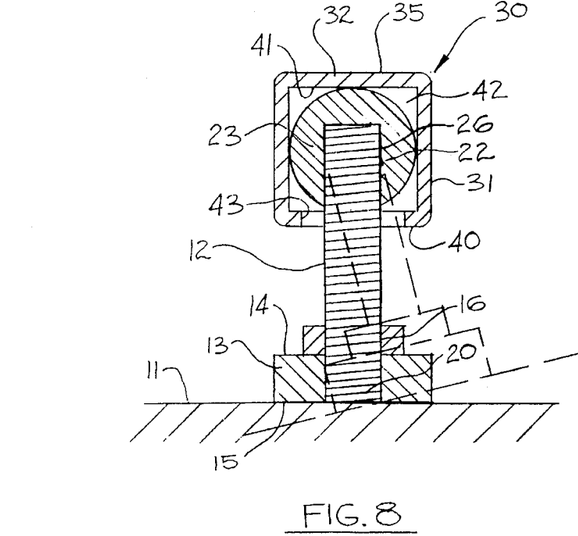
FIG. 8 is a somewhat enlarged, vertical, sectional view of the seat of the subject invention, and which is taken from a position along line 8—8 of FIG. 6.

As best seen by reference to FIG. 4 and 8, the apparatus 10 of the subject invention is mounted on the cabin floor 11 by a plurality of threaded shafts which are generally indicated by the numeral 12. As shown in FIG. 8, each of the shafts has a base portion 13 which is fixed on the cabin floor 11 by using suitable fastening techniques such as welding or by employing other appropriate fasteners such as rivets, screws or the like. The base portion has a top surface 14, and an opposite bottom surface 15 which rests on the cabin floor. A threaded channel or aperture 16 is formed in the base portion and is operable to threadably, or matingly engage the threaded shaft 12. The threaded shaft has a first end 20, which threadably engages the base portion 13, and an opposite second end 21, which is remote thereto. As best seen in FIGS. 6 and 8, a mounting block is fastened on the second end 21. The mounting block has a main body 23 which has a first end 24, and an opposite second end 25. Further a threaded aperture 26 is formed in the main body and is adapted to threadably engage the second end of the threaded shaft. The operation of the mounting blocks and threaded shaft will be discussed in further detail hereinafter.

As best seen by reference to FIGS. 1 and 6, the apparatus 10 of the subject invention includes a first portion which is generally indicated by the numeral 30, and which includes a pair of frame members 31. As best understood by a study of FIG. 4, the pair of frame members are of substantially identical design and therefore for purposes of brevity, only one of the frame members is disclosed herein, it being understood that the other frame member is substantially a mirror image of same. The individual frame members 31 have a substantially rectangularly shaped main body 32. The main body has a first, or forward end 33, and an opposite, second or rearward end 34. The main body additionally has a top, exterior facing surface 35, and an opposite, bottom and exterior facing surface 40. As best seen by reference to FIG. 8, the main body includes an interior facing surface 41, which defines a substantially continuous channel 42, and which extends from the first end 33 to the second end 34. It should be understood that the channel has a predetermined cross sectional dimension. As best seen by reference to FIGS. 6 and 8, a plurality of apertures 43 are formed in predetermined positions in the bottom, exterior facing surface 40. These apertures have cross sectional dimensions which are greater than the outside diametral dimension of the individual shafts 12 which are mounted on the cabin floor 11. As best seen in FIG. 4, these apertures permit the individual mounting blocks to rotate in the channel 42 thereby maintaining the first portion 30 in contact with the cabin floor 11 even though the cabin floor is distorting, as may be the case when the aircraft, not shown, is involved in a crash. As should be appreciated, and during a collision, or crash, the cabin floor will tend to distort and buckle (often significantly) under the forces generated by the crash and therefore, the present arrangement provides a convenient means whereby the floor may distort significantly, but the present arrangement continues to maintain the seat 10 in contact with the cabin floor 11. This is best understood by reference to FIGS. 4 and 8. As shown most appropriately in FIG. 4, the diametral dimension of the main body 23 of the mounting blocks 22 is just slightly less than the cross sectional dimension of the channel 42. This permits the mounting blocks to be slidably and rotatably received in the channel and further permits the rotation as described above.

As best seen by a study of FIGS. 4 and 6, each of the frame members 31 mounts a pair of braces or walls which are generally indicated by the numeral 50. As best illustrated in FIG. 6, the pair of braces 50 include a forwarded brace or wall 51, and a rearward brace or wall 52. The forward brace or wall 51 has a base portion 53 which is fastened by utilizing welding or other techniques on the top, exterior facing surface 35. The forward brace 51 is located at a position adjacent the first, or forward end 33. As illustrated in the drawings, an aperture 54 is formed in the forward brace and is operable to receive a threaded fastener 55 therethrough. The rearward brace 52 also includes a base portion 60 which is fastened on the top or exterior facing surface 35 by utilizing welding or other suitable screw threadable fasteners. The rearward brace 52 has a vertical portion which is generally indicated by the numeral 61, and which has first, second and third apertures formed in predetermined positions therein. These apertures are designated by the numerals 61, 62 and 63, respectively. As shown in FIG. 6, a plurality of threaded fasteners 65 are individually received in each of the apertures 62, 63, and 64, respectively.

As best understood by a study of FIG. 6, the seat 10 of the subject invention and more specifically, each of the frame members 31 include a pair of deformable support members which are generally indicated by the numeral 70. The deformable support members include a first or forward member 71, and a second or rearward member 72. Each of the support members have opposite ends which have apertures 73 formed therein. The apertures are operable to accommodate screw threadable fasteners such as that shown in 55 and 65, respectively. It should be understood that the deformable support members are manufactured from a metal substrate which deforms or otherwise bends and distorts when exposed to a force of a predetermined magnitude. The function of the individual deformable members, and the significance of these subassemblies vis-a-vis the present seat will be discussed in greater detail hereinafter.

As most clearly illustrated by reference to FIG. 6, the seat 10 includes a first engagement surface 80 which is mounted on the vertical portion 61 of the rearward brace or wall 52. The first engagement surface 80 has a main body 81 which has a pair of apertures formed therein, not shown, but which are operable to receive the threaded fasteners 65 therethrough, the fasteners securing the main body 81 on the vertical portion 61. The main body 81 has an arcuately shaped peripheral edge 82 which is disposed in juxtaposed relation relative to the deformable support member 72. It should be understood that the main body 81 is operable to facilitate the deformation or distortion of the individual deformable support members, as shown in phantom lines in FIG. 6, when the seat 10 is exposed to a force of a predetermined magnitude such as would be the case during an aircraft mishap, crash or similar occurrence. It will be recognized, of course, that the seat 10 may include more than two deformable members per frame member 31. Further, the materials utilized to fabricate the individual deformable members may be selected for purposes of providing a seat having predetermined force dissipation characteristics.

The individual deformable support members 70 are operable to position a second portion 90 in predetermined spaced relation relative to the first portion 30. The second portion 90 includes a main body 91 having a forward end 92, and an opposite, rearward end 93. Further, and as best illustrated by reference to FIG. 3, the main body 91 has an aperture 94 having predetermined dimensions formed therein. The aperture 94 includes a recessed portion which is generally indicated by the numeral 95. The main body 90 includes a pair of surfaces which are generally indicated by the numeral 100, and which are disposed in predetermined spaced relation one to the other. The pair of surfaces 100 include a first, or top surface 101, and a second, or bottom surface 102. The first and second surfaces 101, and 102, define a cavity 103 therebetween. As best seen by reference to FIGS. 3, 4 and 5, a honeycomb shaped structure, which is manufactured from a synthetic, polymeric-based substrate, is positioned or otherwise sandwiched between the first and second surfaces 101 and 102, and thus received in the cavity 103. The honeycomb structure is secured in the cavity by a suitable adhesive. The operation of the honeycomb structure will be discussed in greater detail hereinafter. As best illustrated by reference to FIG. 6, a pair of braces or walls 110 are mounted on the second or bottom surface 102 and are positioned adjacent the forward and rearward ends 92 and 93 of the main body 91. As will be appreciated, a second pair of braces or walls will be mounted on the opposite side of main body, not shown. The pair of braces or walls 110 are similar in structure to the pair of braces or walls 50 which were described with respect to the first portion 30. The pair of braces or walls 110 include a forward brace or wall 111, and a rearward brace or wall 112. The forward brace or wall 111 has a base portion 113 which is affixed on the second or bottom surface 102 by utilizing welding or other fastening techniques. The forward brace 111 further includes a vertical portion 114, which has formed therein first, second and third apertures 120, 121 and 122, respectively. These apertures are operable to receive individual threaded fasteners 123. Similarly, the rearward brace or wall 112 includes a base portion 130 which is also fastened on the main body by utilizing welding or other fasteners. The rearward brace 112 has an aperture 131 formed therein and which is operable to receive a threaded fastener 132. As shown in FIG. 6, a second engagement surface 140 is fastened on the vertical portion 114 of the forward brace 111. The second engagement surface includes a main body 141 which has formed therein a pair of apertures which are disposed in individual registry with the second and third apertures 121 and 122. As should be understood the fasteners 123 are received through the apertures formed in the main body 141 thereby securing it on the vertical portion 114. The main body 141 includes an arcuately shaped peripheral edge 142.

Figure 3:
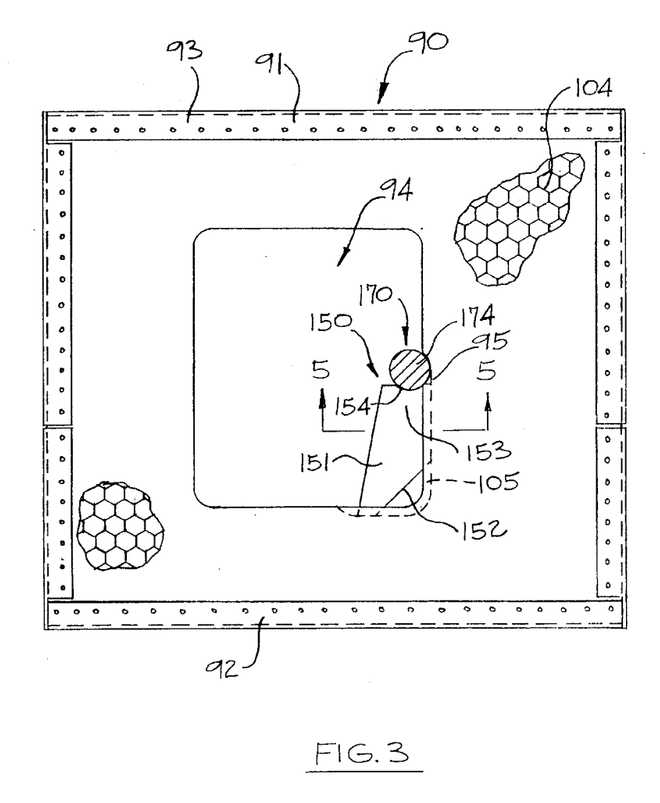
FIG. 3 is a plan view of the seat of the subject invention and which is taken from a position along line 3—3 of FIG. 2.
Figure 5:
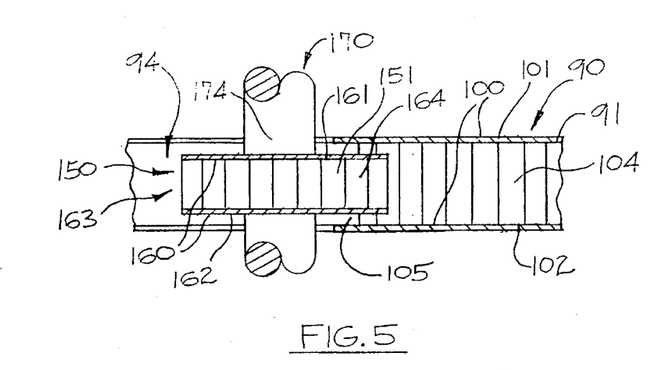
FIG. 5 is a fragmentary, somewhat enlarged, vertical sectional view of the seat of the subject invention and which is taken from a position along line 5—5 of FIG. 3.

As best seen by reference to FIG. 3, the aircraft seat 10 and more specifically the second portion 90 thereof mounts a force transmission member which is generally indicated by the numeral 150. The force transmission member 150 has a main body 151 which has a wedge shaped forward, or core engagement end 152. The core engagement end 152 is positioned in contact with the honeycomb shaped structure which is positioned between the first and second surfaces 101 and 102, respectively. The main body further has a rearward end 153 which has a recess 154 formed therein. The recess is operable to receive a rotatable shaft which will be discussed in greater detail hereinafter. The main body 151 is received or otherwise disposed in an appropriate orientation relative to the honeycomb shaped structure 104 by being received in the recessed area 105 which is defined between the first and second surfaces 101 and 102, respectively. This is best seen in FIGS. 3 and 5. As best seen by reference to FIG. 5, the force transmission member has an internal structure similar to the second portion 90, that is, it has first and second surfaces 161 and 162, respectively which are disposed in predetermined substantially parallel space relation thereby defining a cavity 163 therebetween. Further, a honeycomb shaped structure is sandwiched between the top and bottom surfaces 161 and 162 thereby forming the force transmission member. As earlier discussed, the honeycomb shaped structure 164 is secured therebetween the top and bottom surfaces by means of a suitable adhesive. Further, and as best seen in FIG. 5, the force transmission member has a thickness dimension which is less than the thickness dimension of the second portion thereby permitting the force transmission member to be received in the recessed area 105. The operation of the force transmission member will be discussed in greater detail hereinafter.

As best illustrated by reference to FIG. 1, the seat 10 of the subject invention includes a rotatable shaft which is generally indicated by the numeral 170 and which permits the seat portion to rotate in a substantially horizontal plane. The seat portion will be discussed in greater detail hereinafter. The rotatable shaft has a first end 171 which is affixed on the seat portion and an opposite second end 172. As best seen in FIG. 1, a rotational locking mechanism 173 is fixed on the second end of the shaft and provides a means by which the position of the seat portion can be fixed relative to the cabin floor 11, for takeoffs and landings. The mechanism 173 is disclosed in further detail in U.S. Pat. Nos. 4,671,572 and 4,588,226 which are incorporated by reference herein. For purposes of brevity, therefore, this mechanism is not discussed in any further detail herein. The rotatable shaft 170 has a main body 174 which engages the force transmission member 150. This is seen most clearly by reference to FIG. 3. As should be understood and in the event of an aircraft mishap, such as a crash, or the like, any forward movement of the seat portion by means of the physical forces acting upon the seat 10, or by failure of the mechanism 173, causes the main body 174 to engage the recessed area 154 of the force transmission member 150. When this event occurs, the main body 151 of the force transmission member is urged in a forward direction thereby causing the core engagement end 152 to pierce or otherwise deform the polymeric-based honeycomb shaped structure 104 which is positioned between the first and second surfaces 101 and 102, respectively, of the second portion 90. This, of course, impedes further movement of the seat in a forward direction and further dissipates some of the force of the crash. As best seen in FIG. 1, a shroud or housing 175 encloses the first and second portions 30 and 90, respectively.

Figure 7:
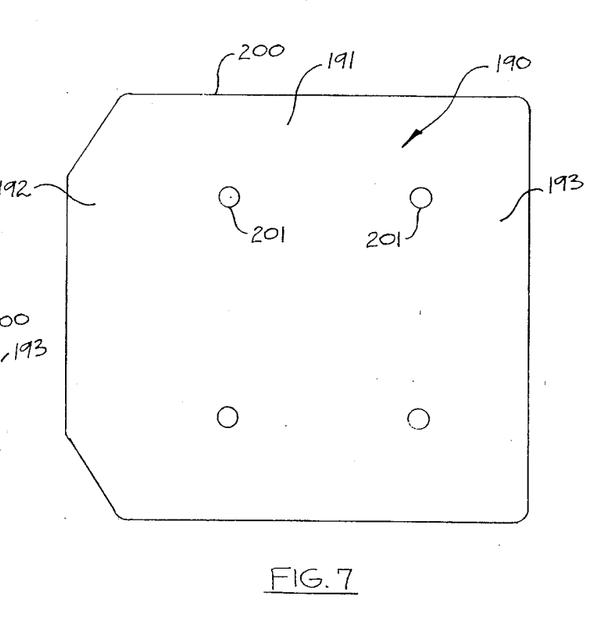
FIG. 7 is a bottom, plan view of the seat of the subject invention and which is taken from a position along line 7—7 of FIG. 1.

The seat 10 includes a seat portion which is generally indicated by the numeral 180 and which is fixed on the rotatable shaft 170. The seat portion 180 has a base or seat pan 181 which is affixed directly on the rotatable shaft. Extending upwardly from the seat pan are a pair of arm rests 182, which are of conventional design. Additionally, and extending upwardly from the seat pan is a seat back 183 of conventional design, and which has a padded, outwardly facing surface for supporting the upper torso of a passenger not shown. As best seen by reference to FIG. 7, the seat portion includes a seat cushion which is generally indicated by numeral 190. The seat cushion has a main body 191 with a first end 192, and a second end 193. Further, the seat cushion has a top surface 194, and an opposite bottom surface 195. It should be understood that the seat cushion is enclosed within a substantially air impervious shell 200. Further, several vent holes 201 are formed in the bottom surface and which provide a means by which air can be exchanged with the ambient environment. It should be appreciated that during an aircraft mishap, such as a crash or the like, the weight of the passengers body acting upon the seat has the propensity for forcing air out of the seat cushion. However, in view of the characteristics of the air impervious shell 200, and the small number of apertures or vents 201, the cushion will remain relatively stiff yet pliable during a collision or crash thereby providing enhanced protection for the passenger.

OPERATION

The operation of the described embodiment of the present invention is believed to be readily apparent and is briefly summarized at this point.

As best seen by reference to FIGS. 1 and 6, an aircraft seat having a force dissipation assembly is generally indicated by the numeral 10 and includes, generally, a first portion 30 which is fixed on the cabin floor 11 of an aircraft, not shown; at least one support member 70 which is borne by the first portion, and a second portion 90 which is borne by the support member and disposed in spaced relation thereto, and wherein a seat portion 180 is borne by the second portion and wherein the first portion is positioned in force transmitting relation relative to the support member. The seat 10 is operable, when force is applied thereto such as what might occur during an aircraft accident, crash or the like, to transmit the force of the crash through the first portion to the support member thereby causing the support member to deform and thus dissipate some of the force acting upon the seat. This deformation is best illustrated by reference to FIG. 6 wherein the second portion is drawn in phantom lines and the individual support members are shown in a deformed state.

More specifically, the seat 10 which is mounted on the cabin floor 11 of an aircraft, not shown, includes a force dissipation assembly which is operable to dissipate the force of a crash and wherein the seat includes a plurality of shafts 12 which are mounted on the cabin floor and individual mounting blocks which are secured on each of the shafts. A first portion 30 includes a pair of frame members having opposite forward and rearward ends, and which further define a channel 42. At least one aperture 43 is formed in each of the frame members. As best seen by reference to FIG. 6, the individual mounting blocks are received in the channel and the shaft extends through the aperture thereby positioning the frame member in spaced relation relative to the cabin floor. A pair of deformable support members 70 are mounted on the forward and rearward ends of each of the frame members. These support members are deformable when exposed to a force of a predetermined magnitude. A first engagement surface 80 is borne on each of the frame members and is disposed near the rearward end thereof, and wherein the engagement surface 80 is positioned in juxtaposed relation relative to the support member which is mounted on the rearward end of the frame member. A second portion 90 has a main body 91 having opposite forward and rearward ends 92 and 93, respectively, and wherein the individual support members are mounted on the forward and rearward ends of the main body. A second engagement surface 140 is borne on the main body and disposed near the forward end thereof and in juxtaposed relation relative to support members which are mounted on the forwarded end of the frame member. It should be understood that when the seat portion 180 is exposed to the forces experienced during a crash, the force of the crash is transmitted from the first portion, to the second portion, by the individual support members, and wherein the force of the crash acting upon the seat 10 urges the support members into contact with the respective engagement surfaces thereby deforming the support members and thus dissipating some of the force of the crash.

Therefore, the seat 10 of the present invention can be employed in a wide variety of operative environments, can be manufactured and purchased at a moderate cost when compared with related prior art devices, is highly efficient in operation and is compact, thereby facilitating its utilization and maintenance, and is further designed in a fashion whereby it reduces to an absolute minimum many of the assorted shortcomings and deficiencies associated with the prior art devices which were designed for substantially identical purposes.

Although the present invention has been shown herein and described in what is conceived to be the most practical and preferred embodiment, it is recognized that departures may be made therefrom within the scope of the invention which is not to be limited to the illustrative details disclosed.

Having described our new invention, what we claim is new and desire to secure by Letters Patent is:

1. A seat comprising:

a first portion including a frame which defines a channel, and which further has an aperture formed therein, and wherein a mounting block is movably mounted in the channel and includes a shaft which extends through the aperture, and wherein the seat is mounted on a floor, and wherein the shaft is fastened on the floor;

a support member borne by the first portion;

a second portion borne by the support member and disposed in spaced relation thereto; and a seat portion borne by the second portion, and wherein the first portion is positioned in force transmitting relation relative to the support member, and wherein force applied to the seat portion is transmitted through the first portion to the support member thus causing the support member to deform and thereby dissipate some of the force acting upon the seat, and wherein the mounting block rotates in the channel upon distortion of the floor thereby maintaining the first portion fixed on the floor.

2. A seat as claimed in claim 1, and wherein the first portion includes an engagement surface disposed in juxtaposed relation relative to the support member and which interacts with the support member when force is applied to the seat portion thereby facilitating the deformation of the support member.

3. A seat as claimed in claim 2, and wherein the frame includes a pair of members which are disposed in spaced relation, one to the other, and which each have opposite forwardly, and rearwardly disposed ends, and wherein individual support members are mounted on the opposite ends of each of the members, and wherein the engagement surface is arcuately shaped and positioned near the rearwardly disposed end of each of the members.

4. A seat as claimed in claim 3, and wherein the second portion has a main body with forwardly and rearwardly disposed ends, and wherein the support members borne on the rearwardly disposed ends of each of the members are mounted on the rearwardly disposed end of the main body, and the support members mounted on the forwardly disposed ends of each of the members are mounted on the forward end of the main body, and wherein an engagement surface is mounted on the main body and disposed near the forward end and in juxtaposed relation relative to the support members mounted on the forward end of the main body.

5. A seat as claimed in claim 4, and wherein the main body has an aperture formed therein, and wherein the main body has top and bottom surfaces which are disposed in spaced relation, one to the other, and wherein a central core is sandwiched between the top and bottom surfaces, and wherein the main body further includes a force transmission member which is operable to engage the central core, and wherein force applied to the seat is transmitted through the force transmission member thereby causing the force transmission member to engage the central core and thus dissipate some of the force applied to the seat.

6. A seat as claimed in claim 5, and wherein the seat further includes a shaft, and wherein the shaft is received through the aperture, and wherein force applied to the seat portion is transmitted to the force transmission member by way of the shaft, and wherein the central core is a polymeric-based honeycomb shaped structure, and the top and bottom surfaces are fixed on the honeycomb shaped structure.

7. A seat for use in a vehicle which has a floor and which is operable to dissipate the force of a crash, the seat comprising:

a shaft, mounted on the floor;

a mounting block secured on the shaft;

a first portion including a frame member having opposite forward and rearward ends, and defining a channel, and which further has an aperture, and wherein the mounting block is received in the channel, and wherein the shaft extends through the aperture, and wherein the frame member is disposed in spaced relation relative to the cabin floor;

a support member mounted on the forward and rearward ends of the frame member and which is deformable when exposed to a force of a predetermined magnitude;

a first engagement surface borne on the frame member and disposed near the rearward end thereof, and wherein the engagement surface is positioned in juxtaposed relation relative to the support member which is mounted on the rearward end of the frame member;

a second portion, including a main body having opposite forward and rearward ends, and wherein the individual support members are mounted on the forward and rearward ends of the main body; and a second engagement surface borne on the main body and disposed near the forward end thereof, and in juxtaposed relation relative to the support member which is mounted on the forward end of the frame member, and wherein the force of a crash is transmitted from the first portion to the second portion by the support member, and wherein the force of the crash acting upon the seat urges the respective support members into contact with the each of the engagement surfaces thereby deforming the support members and thus dissipating some of the force of the crash.

8. A seat as claimed in claim 7, and wherein the main body has top and bottom surfaces which are disposed in spaced relation, one to the other, and wherein a deformable core is sandwiched between the top and bottom surfaces, and wherein an aperture is formed in the main body, and wherein the main body further includes a force transmission member which is operable to engage the deformable core, and wherein the force of the crash is transmitted through the force transmission member thereby deforming the deformable core.

9. A seat as claimed in claim 8, and wherein the frame member has a longitudinal line of reference, and wherein the individual support members distort in a direction which is generally oriented in alignment until the longitudinal line of reference, and wherein the seat further has a seat portion including a shaft which is received through the aperture formed in the main body, and wherein the force of the crash is transmitted to the force transmission member by way of the shaft, and wherein the deformable core is a synthetic-based honeycomb shaped structure, and wherein the top and bottom surfaces of the main body are adhesively secured on the honeycomb shaped structure.

10. A seat for use in an aircraft having a cabin floor comprising:

a frame member having forward and rearward ends, and defining a channel, and wherein the frame member further has a top and a bottom surfaces, and wherein an aperture is formed in a predetermined position in the bottom surface;

a mounting block received in the channel and disposed in registry with the aperture;

a post mounted on the cabin floor and extending through the aperture, the post fixed on the mounting block and positioning the frame member in spaced relation relative to the cabin floor;

a pair of support members individually mounted on the first and second ends of the frame member and extending upwardly relative to the top surface, the individual support members deforming when exposed to a force of a predetermined magnitude;

a second portion, having a main body, which is fixed on the pair of support members, and which is disposed in spaced relation relative to the cabin floor, and wherein the main body defines an aperture, and further has a top surface, a bottom surface disposed in spaced relation thereto, and a deformable core is sandwiched between the top and bottom surfaces, and wherein the second portion further includes a force transmission member which is positioned in the aperture and disposed in force transmitting relation relative to the deformable core;

a first engagement member borne on the bottom surface of the second portion and disposed in juxtaposed, rearwardly oriented relation relative to the support member which is mounted on the forward end of the frame member;

a second engagement member borne on the top surface of the frame member and disposed in juxtaposed, forwardly oriented relation relative to the support member which is mounted on the rearward end of the frame member; and a seat portion having a shaft which is received in the aperture defined by the second portion, and wherein the force exerted on the aircraft seat during a crash causes the shaft to engage the force transmission member thereby urging it into the deformable core and thus dissipate some of the force of the crash, and wherein the force of the crash further urges the individual support members into engagement with the respective first and second engagement members thereby causing them to deform and thus further dissipate the forces acting on the seat.

* * * * *